July 21, 1942.     T. E. BOSWORTH     2,290,161
SPECTACLE TEMPLE
Filed Jan. 24, 1940
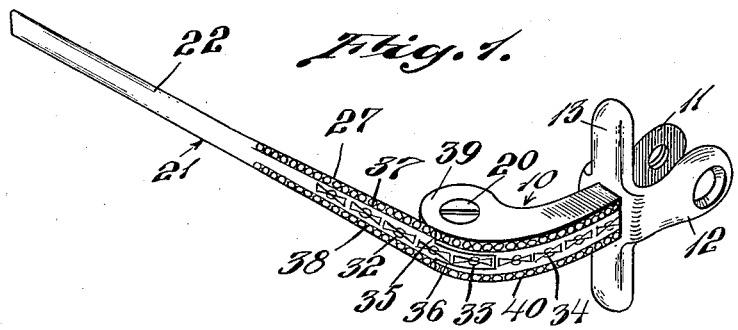
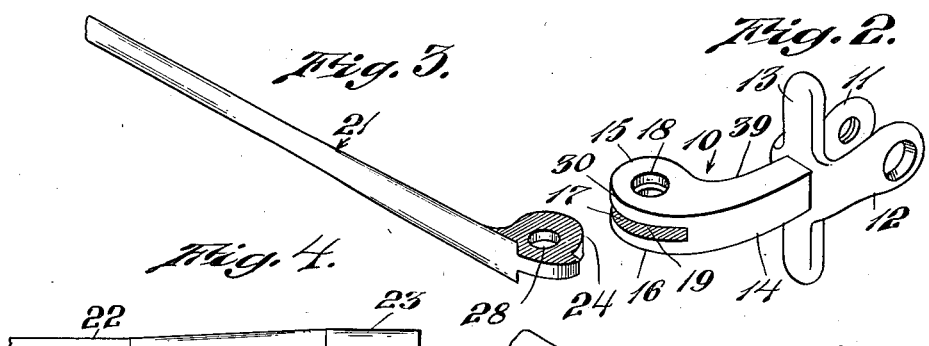
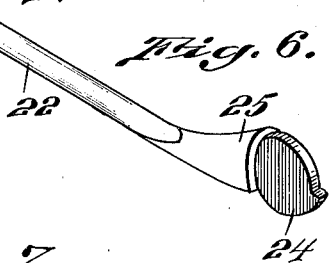
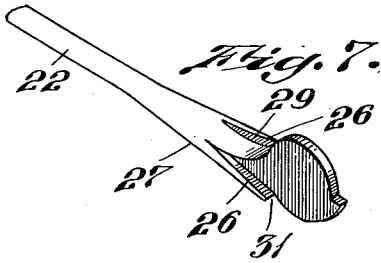
INVENTOR.
Thomas E. Bosworth
BY Barlow & Barlow
ATTORNEYS.

Patented July 21, 1942

2,290,161

UNITED STATES PATENT OFFICE 2,290,161

SPECTACLE TEMPLE

Thomas E. Bosworth, Cranston, R. I., assignor to Universal Optical Company, Inc., a corporation of Rhode Island Application January 24, 1940, Serial No. 315,393

2 Claims. (Cl. 88—53)

This invention relates to a temple for an ophthalmic mounting and has for one of its objects to provide an improved joint for the connection of the temple to the lens.

Another object of the invention is to provide a temple which may be so formed with relation to the member to which it is connected that the joint of the temple with the member may be inconspicuous.

Another object of the invention is to utilize the usual lens member and form the temple so that it will conform to this usual end member and may be used therewith.

Another object of the invention is to provide an inconspicuous joint between the lens member and the temple without changing the end member and by making all change necessary for the result in the temple alone.

Another object of the invention is to form the entire change upon the temple by a swaging operation in two different directions whereby a broadening of the temple in two different directions at right angles to each other may be obtained.

With these and other objects in view, the invention consists of certain novel features of construction, as will be more fully described, and particularly pointed out in the appended claims.

In the accompanying drawing:

Fig. 1 is a perspective view of a lens strap and end portion of temple attached thereto;

Fig. 2 is a perspective view of the lens strap;

Fig. 3 is a perspective view of the end portion of the temple;

Fig. 4 is a view of the temple in one step of its formation;

Fig. 5 is a view of the temple shown in Fig. 4 with the end portion bent;

Fig. 6 is a perspective view of the temple after one swaging operation has been performed;

Fig. 7 is a perspective view after a further swaging operation has been performed upon the temple.

In the use of temples for spectacles it is desirable to provide an inconspicuous joint for the hinge connection of the temple to its mounting; and in order to accomplish this result by changing the temple alone, I have swaged the temple so as to spread the stock thereof in different predetermined directions with one dimension equal in thickness to the member to which it is to be connected so that the upper and lower surfaces of the temple may be flush with the member to which it is connected; and I have so arranged the hinge joint with reference to the outer surface of the temple that a smooth surface may be had so that by formulating a design upon the temple and member to which it is connected, the line of cleavage or joint line between the two may be relatively inconspicuous; and the following is a more detailed description of the present embodiment of this invention, illustrating the preferred means by which these advantageous results may be accomplished:

With reference to the drawing, I have illustrated the lens member in a form frequently termed a strap and designated generally 10, although this may be referred to as an end piece; or other end pieces, such as are formulated on the ends of rims or the like, may be utilized for the hinging of the temple thereto.

This strap member or end piece 10, as shown in perspective in Fig. 2, consists of ears 11 and 12 between which a lens may be positioned with a shoe 13 for engaging and following the edge of the lens. A member 14 extends outwardly and terminates in enlarged generally circular ears 15 and 16 spaced to provide a slot 17 between them. The member 15 has an opening 18 therein, while the member 16 has a threaded opening 19; a pivot screw 20 passes through the hole 18 and is threaded into the opening 19.

The temple which is designated generally 21 consists of a shank portion 22 generally round in cross section which may be of larger diameter 23 at its end. This end 23 is bent as illustrated in Fig. 5 and then swaged to the shape shown in Fig. 6 providing a flattened portion 24 of one thickness and an adjacent portion 25 of another thickness. After this swaging to the shape illustrated in Fig. 6 has been performed, a further swaging occurs of the stock 25 so as to spread it in a plane at right angles to the plane of the tongue portion 24 and provide flanges 26 on either side of the tongue portion and extending rearwardly as shown in Fig. 7 where they taper as at 27 into the shank 22. After this operation is performed, the trimming occurs so as to shape the parts as illustrated in Fig. 7, and a piercing operation is performed to provide the hole 28 in the tongue 24, while the surface 29 is shaped at the time of engraving so as to provide a surface 29 conforming to the curvature of the edges 30 of the ears while thinning out the edge at 31 to merge into the surface of the ears and form a rather sharp edge at this location.

At the time of engraving, an embellishment 32 is placed on the temple extending along the edge of the temple at 33 and merging into the edge of the temple at member 14 so that the joint or cleavage lines 35 and 36 are relatively inconspicuous. The embellished surfaces 32, 33 and 34 are so shaped that there is no raised portion of one with reference to the other and all conform to an even surface along the curved lines of shape which are usual in constructions of this character.

The upper edge 37 and the lower edge 38 also are in the same plane adjacent the joint with the upper surface 39 and the lower surface 40 of the end member 14 so that the line of this end member is continued into the temple, where by reason of the taper 27, it merges into the shank portion 22 gracefully changing its shape so that a harmonious appearance is provided.

The foregoing description is directed solely towards the construction illustrated, but I desire it to be understood that I reserve the privilege of resorting to all the mechanical changes to which the device is susceptible.

I claim:

1. In an ophthalmic mounting, a lens member, a temple, a hinge joint movably relating said member and temple and comprising a pair of generally circular ears providing a slot between them and a tongue on said temple extending into said slot, said temple on either side of said tongue being provided with laterally extending flanges having a thickness equal to the thickness of said member with the inner surfaces of said flanges shaped to conform to the curved ears to lie snugly thereagainst, the flanges being reduced to a sharp edge to merge with the outer surface of said member, said flanges being tapered as they recede from said joint to merge with the temple shank, said temple being laterally thin with the line of its inner surface located wholly outwardly of the said tongue.

2. In an ophthalmic mounting, a lens member, a temple, a hinge joint movably relating said member and temple and comprising a pair of generally circular ears providing a slot between them and a tongue on said temple extending into said slot, said temple on either side of said tongue being provided with laterally extending flanges having a thickness equal to the thickness of said member with the inner surfaces of said flanges shaped to conform to the curved ears to lie snugly thereagainst, the flanges being reduced to a sharp edge to merge with the outer surface of said member, said flanges being tapered as they recede from said joint to merge with the temple shank, said temple being laterally thin with the line of its inner surface located wholly outwardly of the said tongue and stop means being provided on said tongue.

THOMAS E. BOSWORTH.